Dec. 29, 1931.  A. M. JOHNSON  1,838,945
AUTOMATIC MACHINE TOOL
Filed Sept. 16, 1927  4 Sheets-Sheet 1
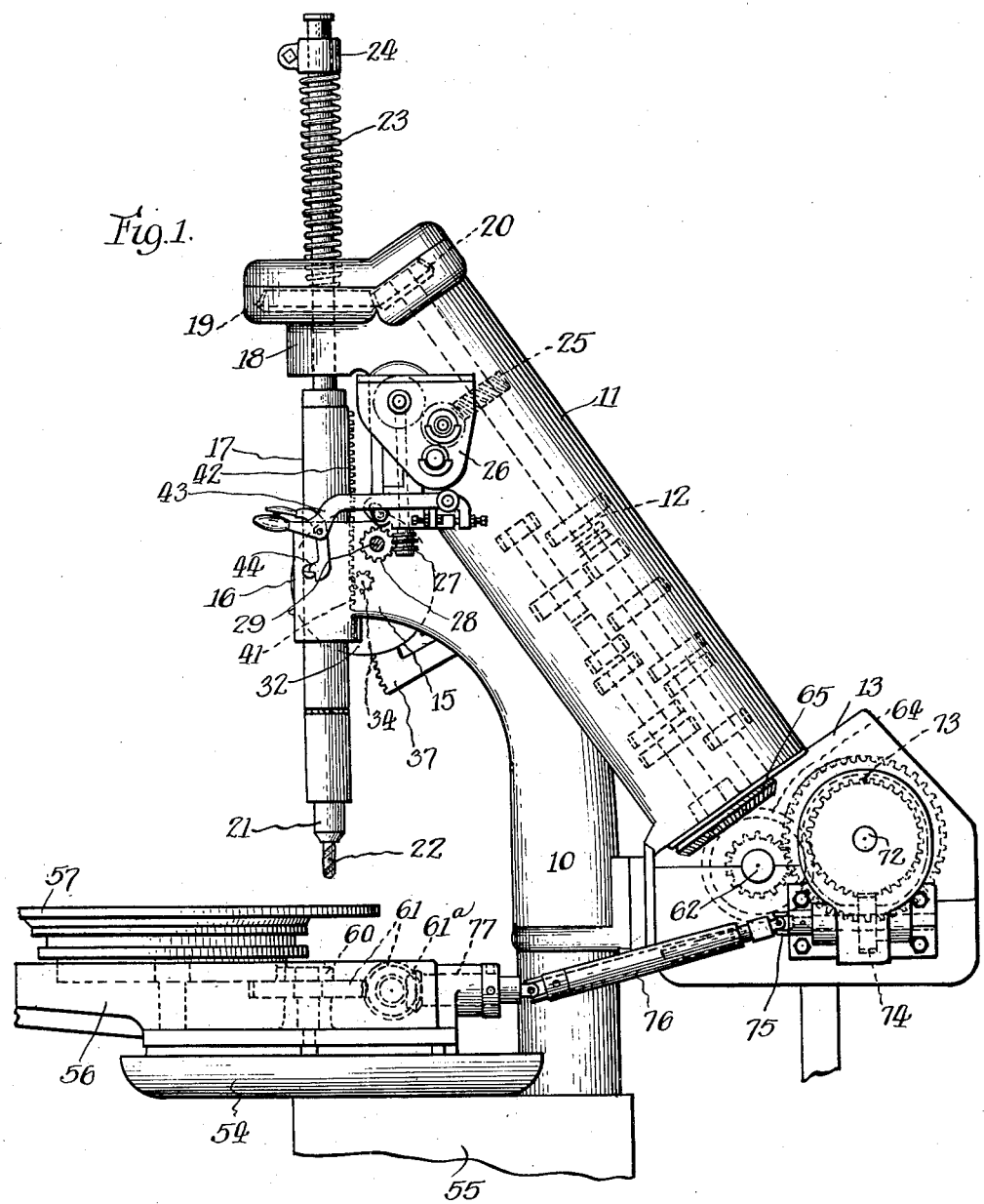

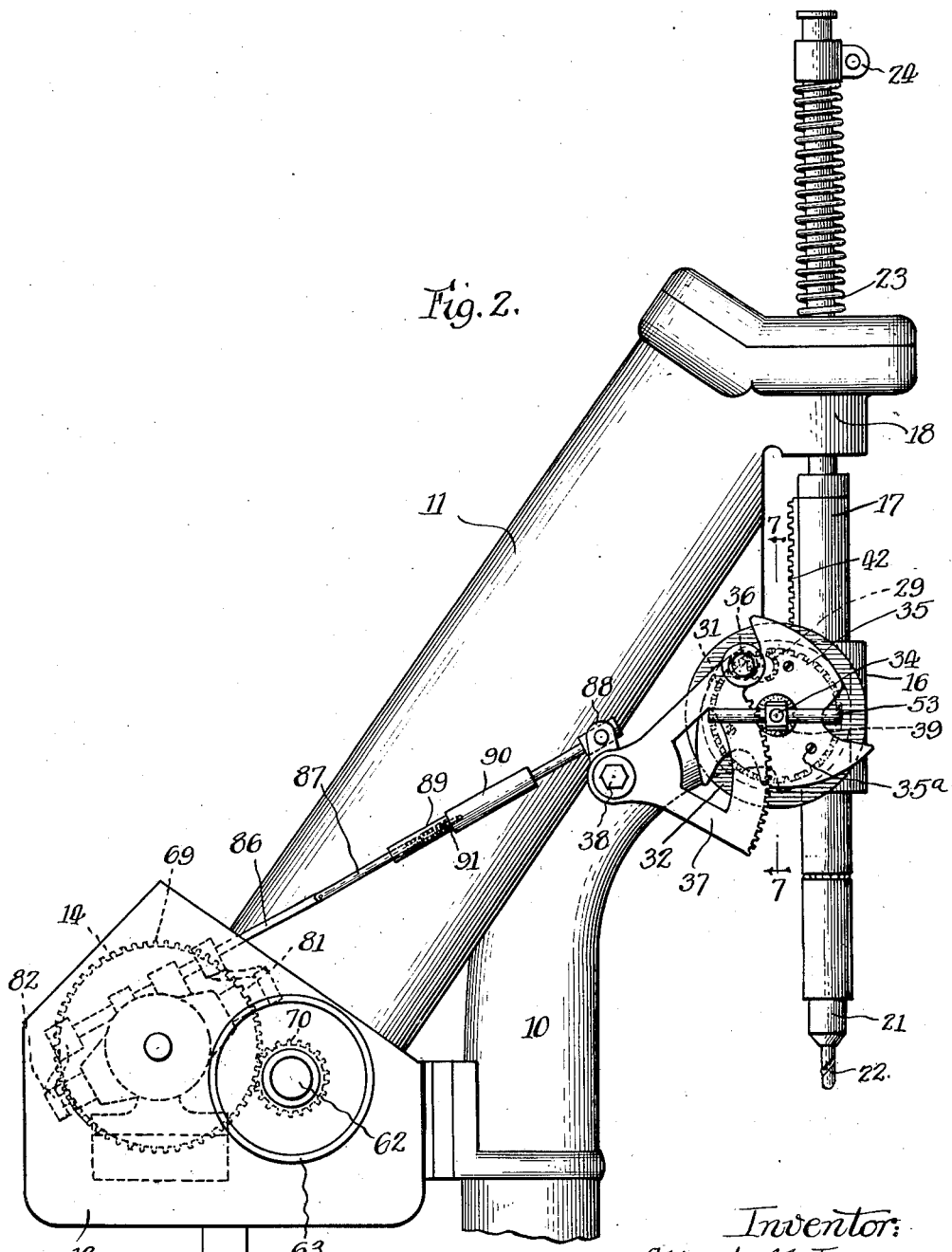

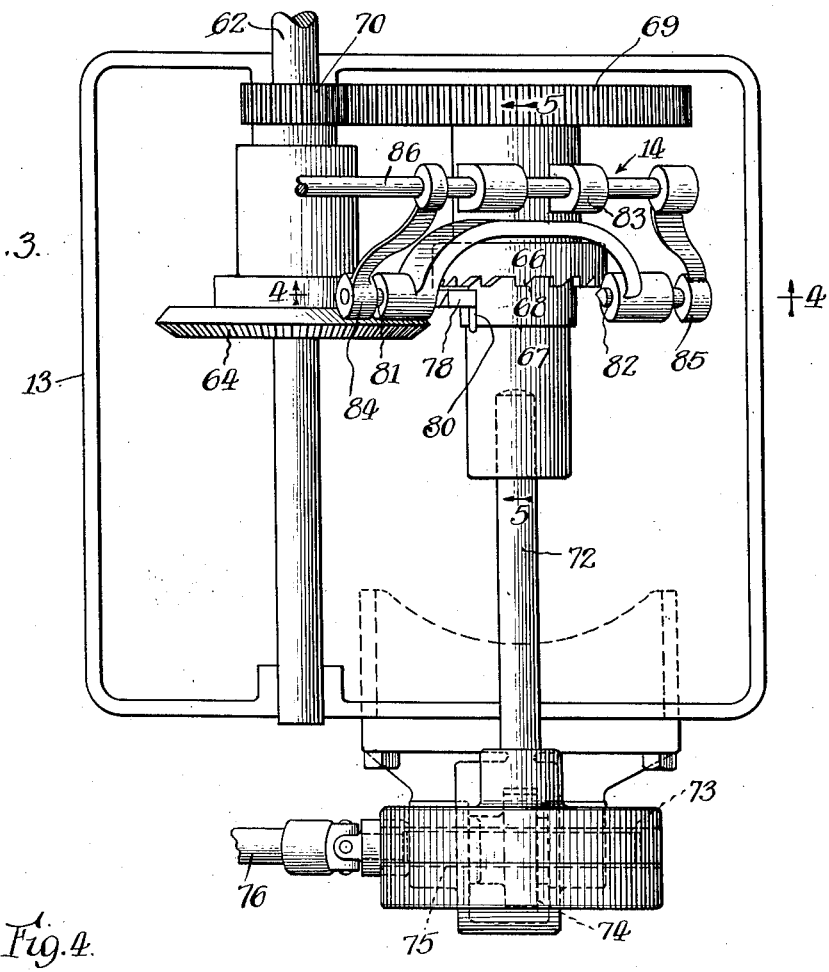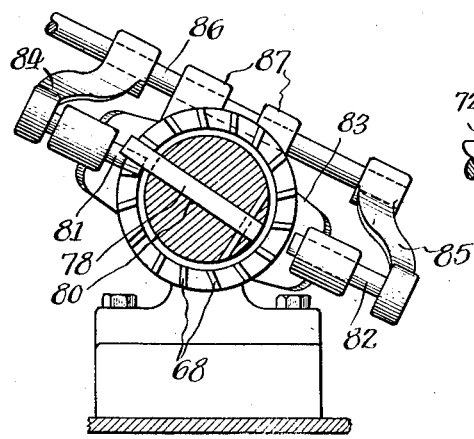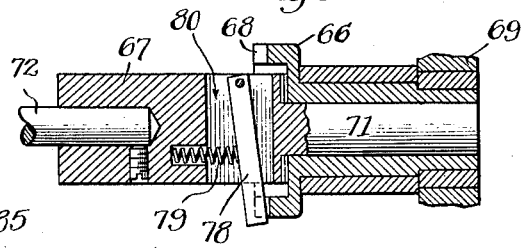

Dec. 29, 1931.  A. M. JOHNSON  1,838,945
AUTOMATIC MACHINE TOOL
Filed Sept. 16, 1927   4 Sheets-Sheet 4

Inventor:
Albert M. Johnson,
By Lindahl Parker & Carlson
Attys.

Patented Dec. 29, 1931

1,838,945

UNITED STATES PATENT OFFICE

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS

AUTOMATIC MACHINE TOOL

Application filed September 16, 1927. Serial No. 219,833.

The invention has general reference to machine tools and relates more particularly to machine tools of the automatic type employed for drilling, boring, facing and similar operations. Such machines commonly employ one or more tool-carrying spindles mounted for longitudinal and rotational movements, and the present invention has for its general aim the provision of improved means for presenting the cutting tool to different pieces of work in rapid succession.

The primary object of the invention is to provide an automatically controlled spindle-feeding cam means of an improved character operable to effect periodic reciprocations of the tool spindle in rapid succession, in each of which the spindle in its movement toward the work first travels at high speed to effect a rapid approach, then at a slow or working speed during the cutting portion of the stroke, and finally returns to its initial positon substantially instantaneously.

Another object is to provide, in combination with an automatically reciprocated spindle, a work-table-indexing mechanism automatically controlled in accordance with the movements of the spindle so as to present pieces of work to the cutting tool in proper timed relation.

A further object is to provide, in combination with an automatically reciprocated spindle in which a rapid approach movement is imparted to the cutting tool, an automatic control mechanism for the work table whereby the latter is indexed in advance of the rapid approach movement of the cutting tool, so that the tool may be fed at high speed into pieces of work of substantial depth, thus avoiding the delay incident to moving the tool into the work at the slow or feeding speed as is required where the indexing operation occurs simultaneously with the rapid approach movement of the tool.

A general object is to provide a machine of the character indicated which is relatively simple in construction and positive and efficient in operation.

I have herein illustrated one embodiment only of my invention, it being understood that various changes in the construction and arrangement set forth may be made by those skilled in the art without departing from the spirit and scope of the invention as expressed in the appended claim.

Figure 1 of the drawings is a fragmentary elevational view of one side of a machine tool embodying my invention.

Fig. 2 is a similar view looking from the opposite side of the machine.

Fig. 3 is a horizontal fragmentary plan view of the control mechanism for the indexing work table.

Fig. 4 is a fragmentary vertical sectional view taken approximately in the plane of line 4—4 of Fig. 3.

Fig. 5 is a fragmentary longitudinal section taken approximately in the plane of line 5—5 of Fig. 3 and showing details of construction.

Figure 6:
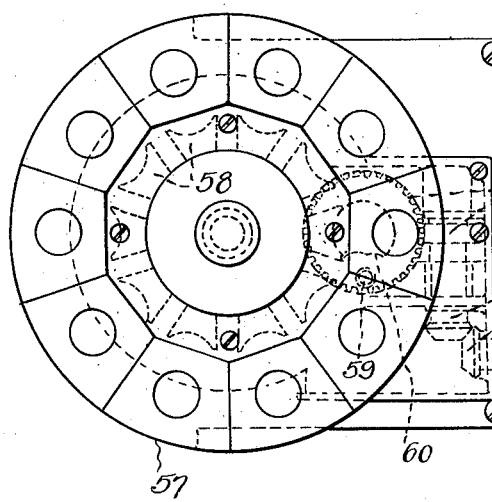
Fig. 6 is a fragmentary plan view of the work table and its supporting slide.

Referring now to the drawings, I have shown and will hereinafter describe my invention as applied to a machine tool of the type in which a single tool spindle is mounted for vertical reciprocation relative to a rotary work table, for the performance in rapid succession of drilling, boring, facing or similar operations upon pieces of work presented in timed relation to the cutting tool. The machine herein shown comprises a frame mounted upon an upright standard 10 and having an inclined upper portion 11 constituting a housing for a speed change mechanism generally designated by the numeral 12. At the lower rear end of the inclined housing 11 is a box 13 enclosing the drive mechanism for the machine, with which is associated an automatic control mechanism 14 operatively connected on the one hand with means for reciprocating the spindle and on the other hand with means for indexing the table.

The upper end of the standard 10 is extended forwardly to provide an arm 15 carrying a tubular head 16. Guided by this head is a vertically slidable sleeve 17 through which the tool spindle extends, the latter being held against longitudinal movement relative to the sleeve in a well known manner. The upper end of the spindle passes through and is journaled in a forward extension 18 of the inclined housing 11, said forward extension 18 serving to enclose a bevel gear 19 with which a pinion 20 at the terminal end of the speed change mechanism is in constant mesh. The lower end of the spindle may carry a suitable chuck 21 for a cutting tool 22; and the upper end of the spindle is in the present instance provided with a coiled spring 23 acting between the bevel gear 19 and a collar 24 for the purpose of effecting the rapid return stroke of the spindle after its downward movement by the feed mechanism.

The feed mechanism is preferably a cam means driven from the speed change mechanism through the medium of a spiral gearing 25 which delivers power to suitable speed reduction gearing in a feed box 26. The latter is pivotally supported at one side of the inclined frame portion or housing 11 and has depending therefrom a worm 27 movable into and out of mesh with a worm wheel 28 on a transverse shaft 29 journaled in the arm 15 of the frame. Rigid with the shaft 29 on the opposite side of the arm 15 is a pinion 30 meshing with an internal gear 31 formed in a drum 32. The drum is journaled on a sleeve 33 fixed in the arm 15 and forming a bearing for a cross feed shaft 34 parallel with the shaft 29.

Rigid with the drum is a peripheral cam 35, the cam being preferably removably secured to the drum as by means of screws 35ª engaging in a peripheral flange on the drum. Coacting with this cam 35 is a roller 36 carried by a gear element 37 in the form of a segment mounted on a stud 38 carried by the standard 10. The segment 37 in turn meshes with a pinion 39 which in the present embodiment has a normal driving connection with the cross feed shaft 34 provided by a clutch 40 hereinafter more fully described. On the cross feed shaft 34 is a feed pinion 41 in constant mesh with a rack bar 42 on the spindle sleeve 17.

It will be apparent that when the worm and worm wheel 27, 28 of the feed mechanism are in mesh the drum 32 will be rotated to operate the cam 35, and the latter, through the medium of the cam follower or roller 36 and the gear segment 37 meshing with the pinion 39, will rotate the cross feed shaft 34 and thereby the feed pinion 41 to effect the downward feeding stroke of the spindle. The feed mechanism may be rendered operative or inoperative manually in any suitable way, as for example by means of the usual hand lever 43 operatively associated with the movable feed box 26 so as to move the worm 27 into and out of mesh with the worm wheel 28, the usual disengageable latch device 44 being provided to hold the worm and worm wheel in mesh.

The cam 35 may be varied at will to impart movements to the tool spindle at the desired speed or speeds. The cam shown herein has three lobes each of which is shaped to effect initially a rapid approaching movement of the tool spindle followed by a gradually decreasing rate of feed until the end of the downward stroke when the cam is cut away sharply to permit the rapid return of the spindle under the action of the spring 23. With the employment of three lobes on the cam, it will be understood, three complete reciprocations of the spindle are effected during each complete revolution of the cam.

Figure 7:
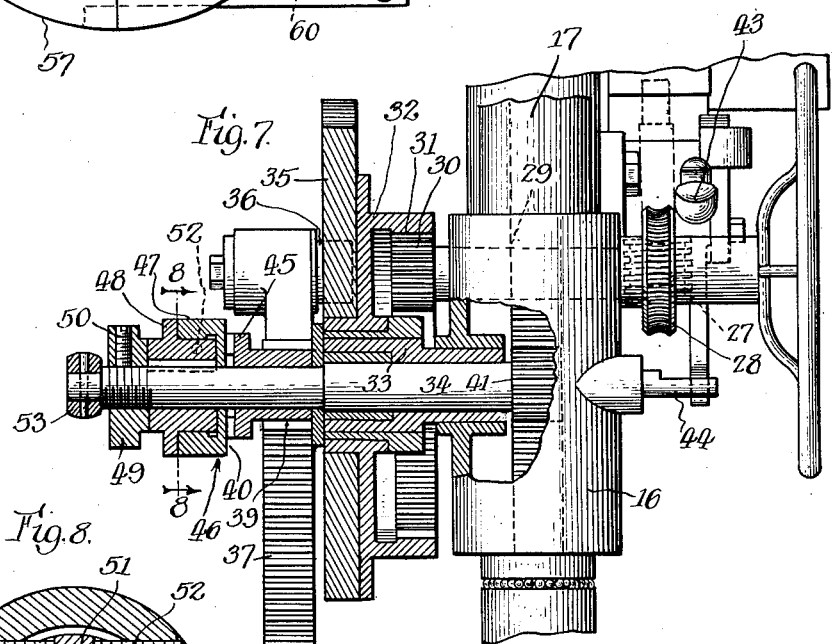
Fig. 7 is a fragmentary vertical sectional view taken approximately in the plane of line 7—7 of Fig. 2, but on a larger scale.
Figure 8:
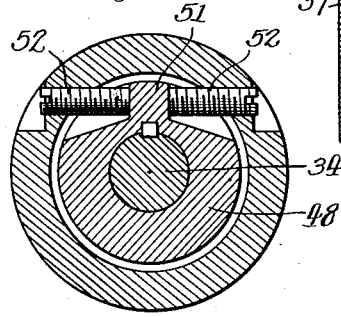
Fig. 8 is a transverse sectional view taken approximately in the plane of line 8—8 of Fig. 7.

The clutch connection between the cross feed shaft 34 and the pinion 39 is provided in order to permit of adjustments to vary the position of the cutting tool at the end of the feeding stroke relative to the work, thus controlling the depth of feed. This clutch connection (Fig. 7) comprises a clutch member 45 with which is rigid the pinion 39 meshing with the segment 37. This clutch member has inclined clutch teeth intermeshing with similar teeth on a second clutch member 46 rigidly connected with the cross feed shaft 34. Connection between the clutch member 46 and the shaft 34 is accomplished by making the member in two sections 47 and 48 held in position on the shaft by means of a collar 49 threaded on the shaft and having a set screw 50. The section 48 of the member 46 is keyed on the shaft and is cut away on one side to form a radial rib 51. Engaging with opposite sides of this rib are a pair of adjusting screws 52 (Fig. 8) mounted in the section 47 which is cup-shaped in form, the screws being approximately tangential relative thereto.

This construction normally effects a rigid connection between the two sections of the clutch member 46 and the shaft 34, but one which is adjustable to effect minute variations in the connections of the tool spindle and the actuating cam, supplementing the coarser adjustment provided between the clutch members themselves as will be more readily understood from the following description of the adjusting operation.

When it is desired to obtain a relatively large adjustment of the spindle with respect to the cam, the collar 49 is first loosened and moved away from the clutch member 48 a sufficient distance to permit the disengagement of the clutch teeth between the members 45 and 46 thus freeing the cross feed shaft 34 from the cam actuated pinion 39. The shaft may then be rotated by hand as through the medium of a handle 53 so as to adjust the tool spindle relative to the gear segment 37 and hence to the cam 35. The adjustment thus provided is obviously limited to the distance between two of the teeth of the interengaging clutch members. To effect a finer adjustment the two sections of the clutch member 46 are adjusted relative to each other by means of the screws 52, it being remembered that one of these clutch members is in driving relation with the clutch member 45 carrying the cam driven pinion 39 and the other in driving relation to the cross feed shaft 34.

In the present embodiment, it is contemplated that after the feed mechanism has been engaged, by the manual operation of the control lever 43, the machine will continue to operate with the spindle making rapid reciprocations to carry the tool toward and from the work. It therefore is necessary that the successive pieces of work to be operated upon be presented in timed relation to the reciprocations of the spindle, and this is accomplished by the automatically operating control mechanism 14 operatively connected on the one hand with the cam feed mechanism through the medium of the segment 37 (Fig. 2) and connected on the other hand with the rotary work table (Fig. 6). The operation of the work table and the control mechanism therefor will now be described.

Referring first to the table as shown in Figs. 1 and 6, this may be of any suitable or preferred character. Herein it is shown as mounted upon a support 54 carried by a column 55 which also carries the standard 10. On the support 54 is a hollow base member 56 which carries the rotary table 57, the latter providing a plurality of work holding devices whereby the pieces of work may be presented successively to the cutting tool. Within the base member 56 is enclosed a suitable indexing mechanism which may be an intermittent gearing of the Geneva stop type. Herein I have shown such an indexing mechanism including teeth 58 with which a roller 59 and a notched disk 60 coact to impart a step-by-step movement to the table with a locking thereof in operative position during each cutting operation. The disk and roller are mounted on a suitable driver actuated through the medium of intermeshing worm gears 61 and bevel gears 61ª one of the latter being connected with the source of power.

Referring to Fig. 3, power for driving the machine is applied in any suitable way to a drive shaft 62 carrying in the present instance a pulley wheel 63. The shaft 62 is journaled transversely of the box or housing 13 at the rear end of the machine and carries in the present instance a miter gear 64 meshing with a similar gear 65 for driving the speed change mechanism 12. Thus the shaft 62 supplies power for the rotation of the spindle, as well as for the operation of the feed mechanism. Furthermore the shaft 62 supplies power for operating the table through the medium of the control mechanism 14.

Generally stated the control mechanism 14 comprises a driving element constantly actuated from the shaft 62, a driven element operatively connected with the table indexing mechanism, and means operating periodically in the movements of the spindle to establish a connection between the driving and driven elements whereby a predetermined arc of movement will be imparted to the latter once for each reciprocation of the spindle. In the present instance, the arrangement is such that at the end of the upward stroke of the spindle and before it commences the next downward stroke the table is indexed to remove one piece of work from position beneath the cutting tool and place the next piece of work into operative position.

As shown in Figs. 2 to 5, 66 designates the constantly rotating driving element of the control mechanism, and 67 indicates the driven element. The driving element 66 is in the form of a drum having inclined clutch teeth 68 and arranged to be connected by a spur gear 69 with a spur pinion 70, the latter being fast on the shaft 62. The driven element 67 is in the form of a cylinder having a stud shaft 71 rigid therewith and extending into the driving element 66, the latter being axially bored for this purpose. The cylinder 67 is also rigid with a shaft 72 extending through and to one side of the box 13 for connection by suitable spiral gearing 73, 74 with a shaft 75. The latter may be connected with the table indexing mechanism by means of a short shaft section 76 flexibly connected at opposite ends with the shaft 75 and a shaft 77 respectively, the latter carrying one of the bevel gears 61ª.

To provide for the periodically dis-engageable connection between the two elements 66 and 67, I employ a pivoted dog 78 (Fig. 5) urged by a spring 79 in the direction of the teeth 68 on the element 66. Said dog is mounted in a slot 80 in the element 67 and projects radially from one side of the element as shown clearly in Fig. 5. When, therefore, the dog engages with the teeth 68, the element 67 is in driven relation to the element 66 and it will be apparent that upon the disengagement of the dog from the teeth 68 the driving relation will be interrupted.

To provide for the periodic disengagement of the dog I employ two pins or studs 81 and 82 mounted upon diametrically opposite sides of the element 67 in the path of rotation of the dog 78. Herein these pins 81, 82 are slidable in a stationary yoke member 83 and the pins in turn are respectively made rigid with arms 84 and 85 mounted upon a rod 86 which is slidable in spaced bearings 87 formed integral with the yoke member 83. The rod 86 is reciprocable in the bearings 87 and it will be apparent that the pins 81 and 82 are thereby adapted to be moved simultaneously so that when one of the pins is moved out of the path of rotation of the dog the other pin is moved into such path.

As shown in Fig. 3, the ends of the pins 81 and 82 adjacent the cylinder 67 are beveled and the free end of the dog 78 is oppositely beveled, the arrangement being such that when either of the pins 81, 82 is disposed in the path of rotation of the dog the latter striking this pin is cammed outwardly with respect to the toothed drum 66, so as to disengage the two elements 66, 67 from each other. When, therefore, the rod 86 is operated to move one of the pins, for example, the pin 81 out of engagement with the dog 78, the latter will under the action of its spring 79 engage with the toothed drum 66 and rotate therewith carrying the driven element 67 with it for approximately one-half revolution or until the dog engages the other pin 82 which has been moved into operative position in the disengagement of the pin 81. Upon the engagement of the dog with the pin 82, the dog becomes disengaged from the toothed drum 66 and the driven element 67 remains stationary until the next operation of the rod 86 in the opposite direction, which effects another half revolution of the driven element 67 to the position shown in Figs. 3 and 4.

The means for operating the rod 86 is, as above indicated, controlled by the movements of the spindle so that at both the upper and lower limits of the spindle travel the driven element 67 of the control mechanism is released for rotation through a half revolution to operate the indexing mechanism. The means provided for this purpose comprises in the present instance a connection between the control rod 86 and the segment 37, which it will be remembered is geared to the cross feed shaft 34 so as to oscillate in the reciprocation of the spindle. This connection comprises a link 87 pivotally connected at one end to the rod 86 and at its other end to an arm 88 rigid with the segment 37. Preferably the link 87 has interposed therein a yieldable lost motion connection to avoid the necessity of a delicate adjustment of the parts. This device comprises two telescoping members 89 and 90 having a pin and slot connection 91 and a coiled spring 92 which normally acts to hold the members 89 and 90 in extended relation.

Assuming the parts to be in the condition shown in Figs. 2 and 6 with the spindle in its uppermost position and the table locked: The cam 35 operating through the follower 36 swings the segment 37 upwardly first rapidly to effect the rapid approach of the cutting tool to the work and then more slowly for the feeding cut. At the end of the downward stroke, with the segment approaching its uppermost position, the rod 87 is moved rearwardly to disengage the pin 82 from the dog 78, whereupon the driven element 67 of the control mechanism operates through its connections with the indexing mechanism to move the roller 59 through a half revolution. At approximately the same time the follower 36 rides off from the cam lobe and the spindle under the action of its spring 23 moves rapidly to its uppermost position. At the end of the upward stroke of the spindle the segment 37 moves to its lowermost position as permitted by the sharp falling off of the cam, and when the segment reaches this position the rod 86 is again operated, but in the opposite direction, to remove the pin 81 from the path of the dog 78. Accordingly the indexing mechanism is again operated, this time to advance the table one step and lock it in proper position. The spindle now starts down with a rapid approach movement under the action of the steep face of the cam, as in the preceding operation.

I claim as my invention:

An automatic machine tool comprising, in combination, a rotary work table, a spindle mounted for reciprocation toward and from the table, a spring tending to restrain movement of the spindle in a downward direction, feed mechanism for moving the spindle downwardly against the action of said spring including a continuously driven cam, a feed shaft geared to the spindle, a follower for said cam geared to said shaft, an indexing mechanism for the table having a rotatable actuating element, clutch-controlled means for rotating said actuating element, and means operating as an incident to the movements of the spindle to control said clutch means and thereby effect the rotation of said actuating element through approximately one-half revolution at each end of the spindle stroke, said actuating element having an operative connection with the table effective to advance the table only in the movement of the spindle by said spring.

In testimony whereof, I have hereunto affixed my signature.

ALBERT M. JOHNSON.